United States Patent
Odakura et al.

(10) Patent No.: US 6,922,634 B2
(45) Date of Patent: Jul. 26, 2005

(54) MEASURING DEVICE, METHOD FOR CORRECTING MEASURED OUTCOMES, PROGRAM AND RECORDING MEDIA

(75) Inventors: Atsushi Odakura, Tokyo (JP); Aki Kariya, Ichikawa (JP); Hiroyuki Yamamoto, Yokohama (JP); Katsutoshi Murata, Kunitachi (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 10/155,838

(22) Filed: May 24, 2002

(65) Prior Publication Data

US 2002/0193942 A1 Dec. 19, 2002

(30) Foreign Application Priority Data

Jun. 1, 2001 (JP) ........................................ 2001-167083

(51) Int. Cl.[7] ............................................... G01C 21/26
(52) U.S. Cl. ...................... 701/211; 701/209; 455/457; 340/539.13
(58) Field of Search ................................ 701/207, 211, 701/300, 208, 209, 212; 455/456.6, 456.3, 457; 340/539.13, 995.16, 995.24, 995.27, 995.14, 995.12, 995.25, 539.2; 342/357.08, 357.09, 357.1, 357.13, 357.17, 457

(56) References Cited

U.S. PATENT DOCUMENTS

| | | | |
|---|---|---|---|
| 4,989,151 A | | 1/1991 | Nuimura |
| 5,155,689 A | * | 10/1992 | Wortham .................. 455/456.3 |
| 5,218,367 A | * | 6/1993 | Sheffer et al. .............. 342/457 |
| 5,959,580 A | * | 9/1999 | Maloney et al. ............ 342/457 |
| 5,995,023 A | | 11/1999 | Kreft |
| 6,140,964 A | * | 10/2000 | Sugiura et al. ............. 342/464 |
| 6,266,615 B1 | * | 7/2001 | Jin ............................ 701/213 |
| 6,314,365 B1 | * | 11/2001 | Smith ........................ 701/200 |
| 6,339,746 B1 | * | 1/2002 | Sugiyama et al. .......... 701/209 |
| 6,353,798 B1 | * | 3/2002 | Green et al. ................ 701/213 |
| 6,529,828 B1 | * | 3/2003 | Williams et al. ............ 701/213 |
| 6,654,683 B2 | * | 11/2003 | Jin et al. .................... 701/207 |
| 6,674,445 B1 | * | 1/2004 | Chithambaram et al. ... 345/619 |
| 6,674,849 B1 | * | 1/2004 | Froeberg ............... 379/201.06 |
| 2004/0030493 A1 | * | 2/2004 | Pechatnikov et al. ....... 701/208 |
| 2004/0220726 A1 | * | 11/2004 | Jin et al. .................... 701/207 |

FOREIGN PATENT DOCUMENTS

| | | |
|---|---|---|
| EP | 0 306 088 A1 | 3/1989 |
| EP | 1 102 510 A1 | 5/2001 |
| FR | 2 801 158 | 5/2001 |
| GB | 2 298 539 A | 9/1996 |
| GB | 2 358 515 A | 7/2001 |
| JP | 2000-161973 A | 6/2000 |
| WO | WO 99/09374 | 2/1999 |

* cited by examiner

*Primary Examiner*—Michael J. Zanelli
(74) *Attorney, Agent, or Firm*—Brinks Hofer Gilson & Lione

(57) ABSTRACT

A measuring device, with a display mode able to display separately map elements specified by a user selected from a list of map elements existing within the error span of the measured distance of a location by the help of which, the user can determine his/her own location and correct the measured distance of the location.

13 Claims, 11 Drawing Sheets

PLEASE INPUT YOUR
DESTINATION

1. ADDRESS

2. TELEPHONE NUMBER

MEASURING DEVICE, METHOD FOR CORRECTING MEASURED OUTCOMES, PROGRAM AND RECORDING MEDIA

TECHNICAL FIELD

The present invention relates to a measuring device for correcting the measured position of a location, a method for correcting the outcome of the measurement, a program and recording media.

BACKGROUND ART

Portable terminals which are used for navigation are commonly known and used.

Terminals of this type are able to determine the location of the user during navigation, and calculate routes in a latitude and longitude matrix from the measured position of a location to the destination, and display the routing information. The measuring methods used in this case are, for instance, the ones which use PHS (Personal Handyphone System: registered trademark) or GPS (Global Positioning System).

When a PHS is used, for instance, measuring is carried out as follows.

A PHS terminal which the user carries, receives annunciation signals transmitted from a plurality of base stations within the PHS network and specifies 2 or 3 annunciation signals in descending order of strength by measuring their electric field strengths. The annunciation signal contains identification information about the base station that is transmitting the signal. The PHS terminal identifies the base station by referring to this identification information. At this point, the location of each base station is already known; thus, the distance between the location of the PHS terminal and the destination base station can be calculated. The navigation path is drawn on the basis of the identification information contained in the annunciation signals transmitted from the base stations.

Incidentally, the navigable areal scope within a PHS network is defined by the radio cells formed by base stations deployed in the PHS network. The radio cell is generally called a micro cell, and its cell domain is relatively small. The size of this cell domain is indeed some hundred meters in diameter.

Therefore, if the location of a PHS terminal is measured by the above measuring method, a positioning error in the range of 100 to 500 meters usually results. There is a fear that the precise navigation path cannot be determined when the destination is calculated, using the measuring method.

The present invention takes into consideration the limitations of the above mentioned prior art, and its object is to provide a measuring device by which the error of the measured outcome can easily be corrected. Thus the invention provides a method for correcting the outcome of the measurement, an apparatus for performing the method, a program and recording media.

DISCLOSURE OF INVENTION

To solve the problem of the prior art mentioned above, the measuring device of the present invention comprises an inputting means for receiving input operations by a user; a displaying means for displaying several kinds of information; a location obtaining means for obtaining location data for displaying a location of the user; a map display controlling means for displaying a location indicated by location data obtained by the location obtaining means by overlapping with a map on the displaying means; a list display controlling means for displaying a name-list of map elements which exist within a specified domain of the location indicated by the location data on the displaying means; an element display controlling means for displaying a map element indicated by a name the user selected from among the displayed name-list of map elements by inputting operation on the displaying means in a different display mode than the map elements on the map; and a correcting means for correcting a location specified by a user using the inputting means to show the users location on a map displayed by the element display controlling means.

In this configuration, a map element indicated by a name the user selected from the list of map elements which exist in the specified domain of the obtained location are displayed in a display mode which is different from other map elements on the map. On this map, the location specified by the user is corrected to the location of the user.

In a second aspect of the invention, the measuring device of the present invention comprises an inputting means for receiving inputs from a user; a displaying means for displaying several kinds of information; a location obtaining means for obtaining location data displaying the location of the user; a map display controlling means for displaying a location indicated by location data which is obtained by the location obtaining means by overlapping with a map on the displaying means; a list display controlling means for displaying a name-list of map elements which exist within a specified domain of a location indicated by the location data on the displaying means; and a correcting means for correcting a location the user selected from a name-list of the indicated map elements closest to the user's own location.

In this configuration, the name-list of map elements which exist in the specified domain, are displayed, and the user selects, the name of the element closest to him from the displayed name-list. Then the system corrects the location of the user to the element selected.

In a third aspect, the measuring device of the present invention comprises an inputting means for receiving inputs from a user; a displaying means for displaying several kinds of information; a location obtaining means for obtaining location data indicating a location of the user calculated on the basis of base station identification information contained in annunciation signals received from base stations of a mobile communication network; a map display controlling means for displaying a location indicated by location data obtained by the location obtaining means by overlapping with a map on the displaying means; and a correcting means for correcting the location specified by the user to the location of the user on a map displayed by the element display controlling means.

In this configuration, the location obtained by the location obtaining means overlaps with the map. The user specifies the correct location and the location of the user on the map is corrected.

The measuring outcome correcting method comprises a location obtaining step wherein a measuring device obtains location data showing its location; a map displaying step wherein the measuring device displays the location indicated by location data obtained by the location obtaining step by overlapping with a map; an itemizing step wherein the measuring device displays a name-list of map elements existing in a designated domain of a location indicated by the location data; an element displaying step wherein the measuring device displays a name the user selected from a name-list of the displayed map elements in a display mode different from other map elements on the map; and a correcting step wherein the measuring device, on a map displayed by the element displaying step, corrects the indicated location to a location of the measuring device that the user specifies.

In this configuration, a map element the user selected from the displayed name-list of map elements which exists in the specified domain of the obtained location is displayed in a mode that is differentiated from the other map elements on the map. On this map, the location specified by the user is corrected to the location of the user.

In another aspect of the invention, the measurement outcome correcting method comprises a location obtaining step wherein the measuring device obtains location data showing its location; a map displaying step wherein the measuring device displays a location indicated by location data obtained by the location obtaining step by overlapping with a map; a list displaying step wherein the measuring device displays a name-list of map elements existing in a designated domain of a location indicated by said location data; and a correcting step wherein the measuring device corrects the location of map elements which names the user specified from a name-list of the displayed map elements to indicate a location of the measuring device.

In this configuration, the name-list of map elements are displayed which exist in the specified domain of the obtained location, and the element the user selected from the displayed name-list indicates the actual location of the user.

Still in another aspect of the invention, the measuring outcome correcting method of the present invention comprises a location obtaining step wherein the measuring device obtains location data showing the location of the measuring device calculated on the basis of base station identification information contained in the annunciation signals transmitted from the base station; a map displaying step wherein the measuring device displays the location indicated by location data obtained by the location obtaining step by overlapping with a map; and a correcting step wherein the measuring device corrects the location specified by the user to the location of the measuring device on the map displayed by the map displaying step.

In this configuration, the location specified by the user is corrected to the location of the user on the displayed map by overlapping the obtained location with the map.

The program for the present invention causes a computer to execute: a process for receiving an input operation by a user; a process for obtaining location data indicating a location of the user; a process for displaying a location which location data obtained by the process for obtaining location data indicates by overlapping with a map; a process for displaying a name-list of map elements existing in a specified domain of the location indicated by the location data; a process for displaying a name of a map element the user selected by the inputting function from among the displayed name-list in the display mode differentiating from the other map elements on the map; and a process for correcting the location the user specifies in the process for receiving an inputting operation to the location of the user on the map displayed in the process for displaying map elements.

The program of the present invention also causes a computer to execute: a process for receiving an input operation performed by a user; a process for obtaining location data indicating the location of the user; a process for displaying the location which location data obtained by the process for obtaining location data indicates by overlapping with a map; a process for displaying a name-list of map elements existing in a specified domain of the location indicated by the location data; and a process for correcting the location the user selected by the inputting means from among the displayed name-list to the location of the user.

Also, the program of the present invention causes a computer to execute: a process for obtaining location data indicating the location of the user calculated on the basis of the electric field strength of signals received from a plurality of base stations; a process for receiving an input operation performed by a user; a process for displaying the location indicated by location data by overlapping with a map; and a process for correcting the location a user specifies in the process for receiving an input to indicate the location of the user on a map.

EMBODIMENT OF THE INVENTION

Hereafter, the embodiment of the present invention will be explained by referring to figures.

A: Configuration (1) Entire Configuration of the System

Figure 1:
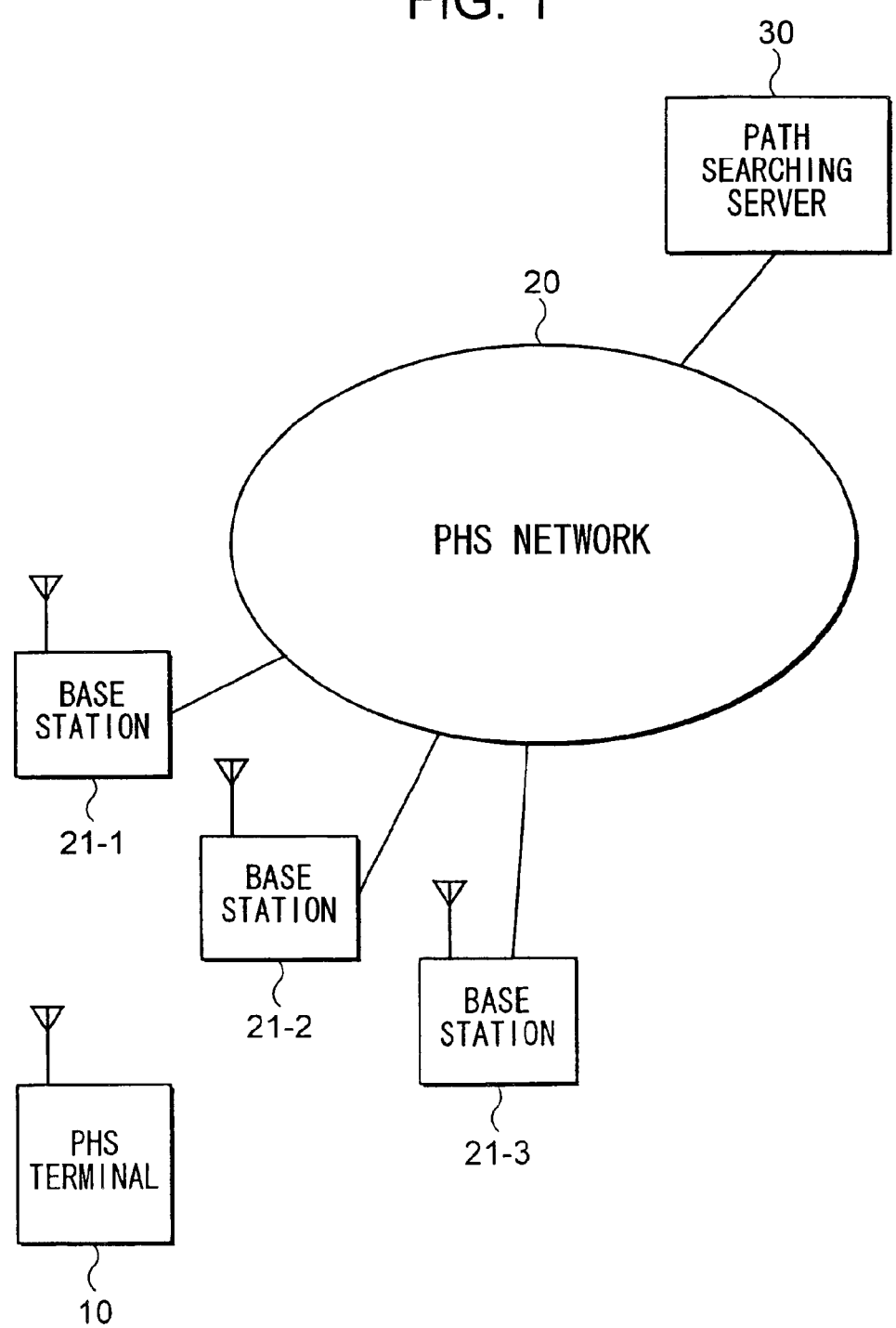
FIG. 1 is a block diagram showing the configuration of the entire system which pertains to one embodiment of the present invention.

FIG. 1 is a block diagram showing the entire configuration of the system which pertains to the embodiment. As shown in FIG. 1, this system is equipped with PHS terminal 10 which a user carries, PHS network 20 which serves PHS terminal 10, and path searching server 30 which is connected to PHS network 20.

PHS network 20 consists of base stations 21-1 to 21-3 installed at intervals of some hundred meters; a switching station (figure is omitted) for performing circuit switch within the PHS network 20; communication lines (figure is omitted) for connecting base stations 21-1 to 21-3 to the switching station and so forth. Each base station 21 forms a radio cell of approximately a hundred meter radius and transmits, within the radio cell on a regular basis, annunciation signals containing the base station ID (IDentification) unique to each base station 21.

Although only three base stations 21-1 to 21-3 are shown in FIG. 1, many more are actually deployed throughout the entire service area of the PHS network 20. The configuration and operations are the same for all these base stations 21-1 to 21-3; hence, they will be collectively referred to as base stations 21 or base station 21 individually, hereafter.

The PHS terminal 10 performs data communication with the path searching server 30 via the PHS network 20 by performing radio communication with the base station 21 through a TDMA (Time Division Multiple Access) scheme.

The PHS terminal 10 is capable of intermittently and selectively receiving annunciation signals transmitted from a plurality of base stations 21 over an appropriate channel out of a plurality of channels set up by the TDMA scheme and detecting the electric field strengths of the received annunciation signals. The base station IDs (IDentifications) contained in these annunciation signals and the electric field strengths detected by the PHS terminal 10 are used for detecting the location of the PHS terminal 10.

Path searching server 30 stores map data that shows maps of various regions and is a computer that provides the route searching service to the user of the PHS terminal 10, based upon the map data. More specifically, the path searching server 30 calculates the position of the location of the PHS terminal 10 based upon the base station ID (IDentification) given by the PHS terminal 10, and calculates the position of the current location thereof and the optimum route to the destination designated by PHS terminal 10. The path searching server 30 then transmits these calculation outcomes to PHS terminal 10 via PHS network 20.

(2) Configuration of the PHS Terminal 10

Next, the configuration of the PHS terminal 10 will be explained.

Figure 2:
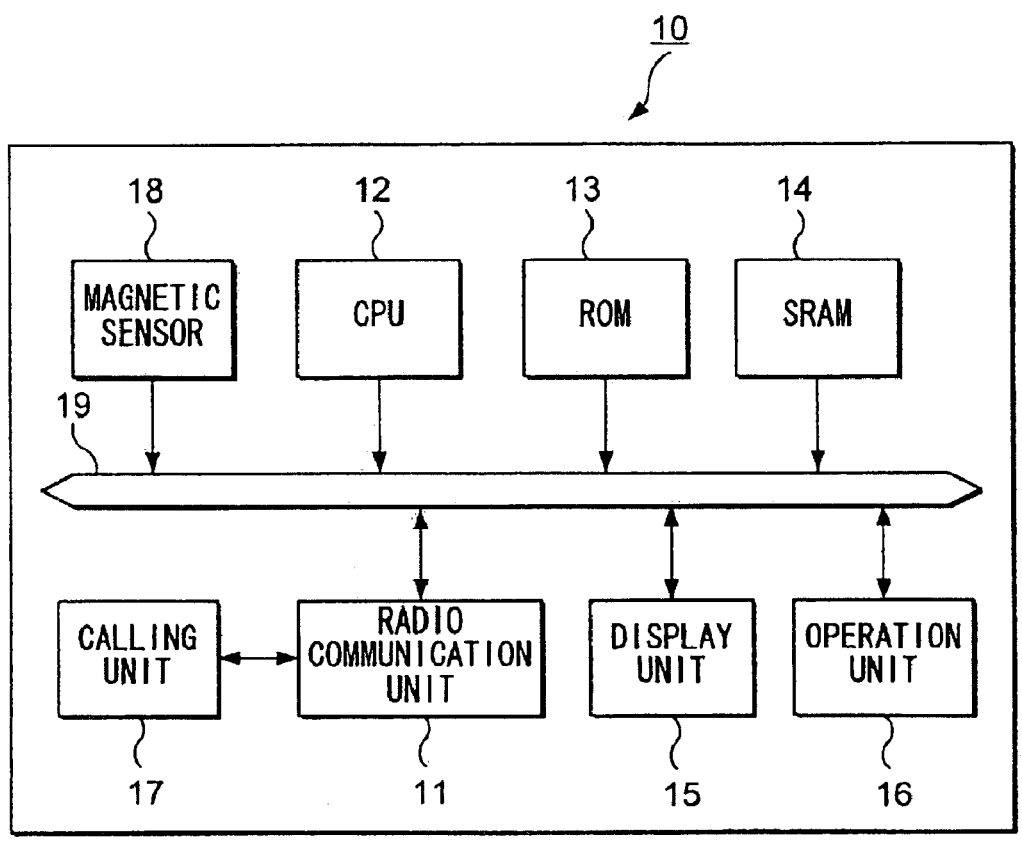
FIG. 2 is a block diagram showing the configuration of a PHS terminal of the same embodiment.
Figure 3:
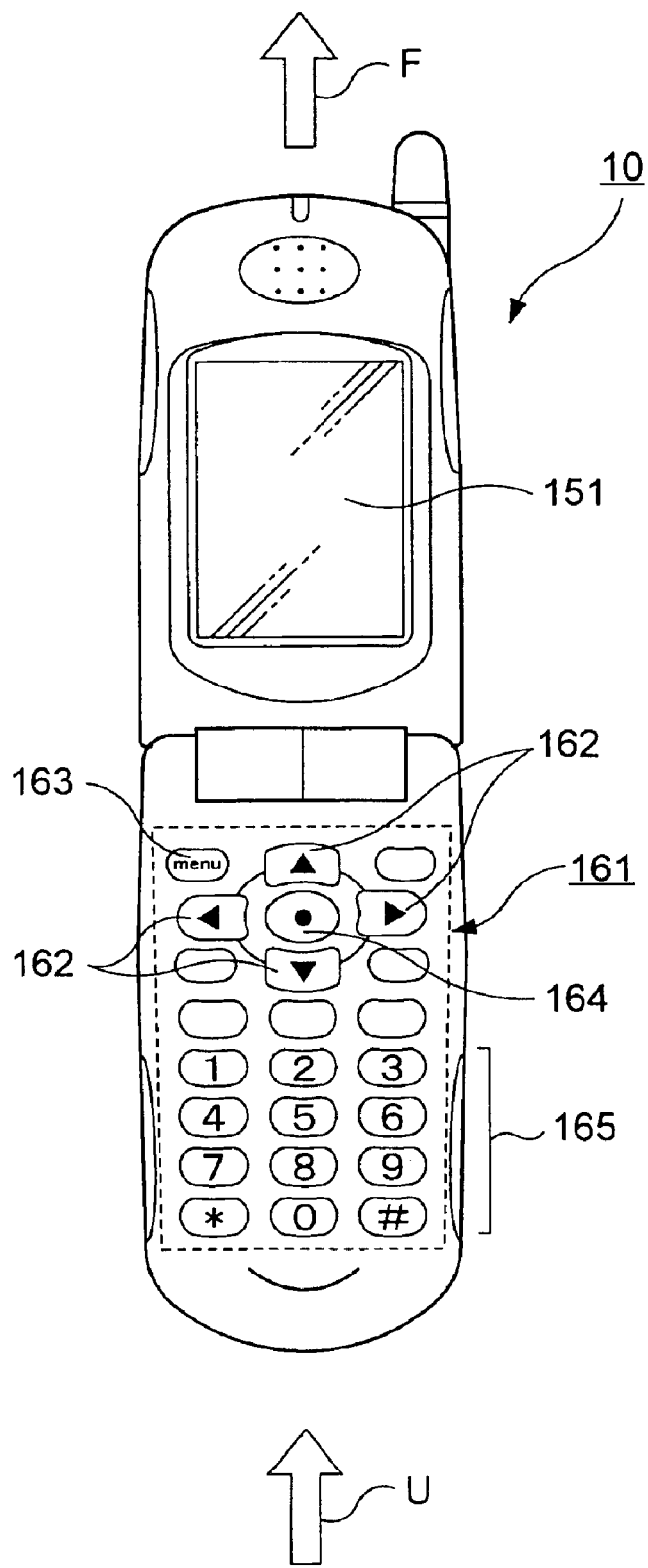
FIG. 3 is the ground plan showing the external appearance of a PHS terminal of the same embodiment.

FIG. 2 is a block diagram showing the electric configuration of the PHS terminal 10. FIG. 3 is a ground plan showing the external appearance of the PHS terminal 10.

As shown in FIG. 2, the PHS terminal 10 is equipped with a radio communication unit 11, the CPU (Central Processing Unit) 12, the ROM (Read Only Memory) 13, the SRAM (Static Random Access Memory) 14, the display unit 15, the operation unit 16, the calling unit 17, the ground magnetic sensor unit 18 and a bus 19 for connecting these.

The radio communication unit 11 is equipped with an antenna which is not shown, a frequency synthesizer, a TDMA processing circuit, the electric field strength detecting circuit and so forth, and performs synchronized radio communication with base stations 21 of PHS network 20. The electric field strength detecting circuit detects the electrical field strengths of, the annunciation signals intermittently received from base stations 21.

Control programs and data are stored in the ROM 13. With regard to the stored data, there is a menu screen data selection for displaying service menus which can be shown to the user. Among the control programs, there is a path guiding program that shows the user a map and a route thereon, using display unit 15. The data communication is performed with path searching server 30 during this process.

The SRAM 14 is a memory to be used that contains a work area for the CPU 12 in which programs for the CPU 12 are executed, and data are temporarily stored therein.

The display unit 15 comprises a liquid crystal display, a crystal driver that effects liquid crystal displaying and so forth. The display unit 15 displays various information, such as maps and texts under the control of the CPU 12.

The operation unit 16 comprises a keypad, a key detecting circuit which is electrically connected to the key pad and so forth. The key detecting circuit produces detection signals in response to the keypad operation by the user, and supplies the produced detection signals to CPU 12 via bus 19. The CPU 12 detects the user's keypad operation through the supplied detection signals, and executes the processes accordingly to the key operation.

Calling unit 17 consists of a microphone, a speaker and a voice CODEC which the user needs for voice communication.

Ground magnetic sensor unit 18 detects the direction toward which PHS terminal 10 is oriented, produces direction information from the detected direction and provides the direction information to CPU 12 via bus 19. CPU 12 displays a map on the liquid crystal display in the orientation according to the provided direction information.

In the present embodiment, "the direction which the PHS terminal 10 is oriented toward" will be the direction shown by arrow F in FIG. 3, and the angle formed between "the direction which the PHS terminal 10 is oriented toward" and the benchmark direction, which is the north in this embodiment, will be direction information θ. In this embodiment, it is assumed that liquid crystal display 151 is laid more or less parallel to the ground.

Figure 4:
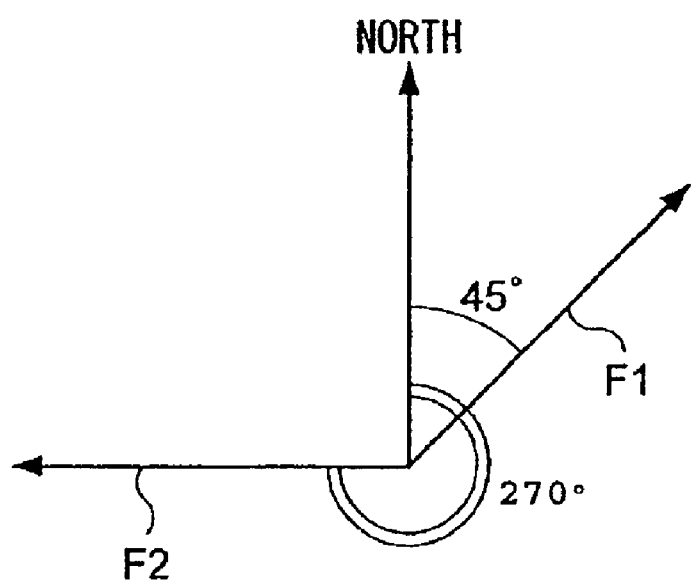
FIG. 4 is a diagram showing direction information of the same embodiment.

For instance, in the diagram in FIG. 4, when the direction of the PHS terminal 10 turns toward the right by 45 degrees from the north as indicated by arrow F1 (in other words, when PHS terminal 10 is oriented toward the northeast), the direction information θ is equal to 45 degrees. Also, when the direction of the PHS terminal 10 turns toward the right by 270 degrees from the north as indicated by arrow F2 (in other words, when the PHS terminal 10 is oriented toward the west), the direction information θ is equal to 270 degrees.

When the PHS terminal 10 is oriented toward the northeast, CPU 12 displays a map, based on the direction information θ (=45 degrees), in such a manner that the direction of the PHS terminal 10 points northeast on the map. This is because the position of the location can be determined more easily by turning the map being looked at by the user to the direction of the map. The user thereby looks at the map in the direction of arrow U as shown in FIG. 3.

Next, by referring to FIG. 3, the external configuration of the PHS terminal 10 will be explained.

As shown in FIG. 3, in the front face of the PHS terminal 10, a liquid crystal display 151 and a keypad 161 are provided.

The keypad 161 is equipped with keys 162 to 165 whose operations will be explained as follows.

By pressing any key of the cursor keypad 162, the user, or a screen control, can move the cursor in any of the directions shown by the arrows indicated on the upper face of each key.

Next, key 163 is a menu key. When the menu key 163 is pressed by the user, a menu screen which lists a menu of various processes will be displayed on the liquid crystal display.

Similarly, key 164 is the determination key. When the determination key 164 is pressed by the user, the process displayed in liquid crystal display 151 will be selected and executed by CPU 12.

And, 165 is a numeric keypad that comprises keys. When a key in the numeric keypad 165 is pressed by the user, the number or the letter which corresponds to the pressed key will be displayed.

(3) Configuration of the Path Searching Server 30

Next, the configuration of the path searching server 30 will be explained.

Figure 5:
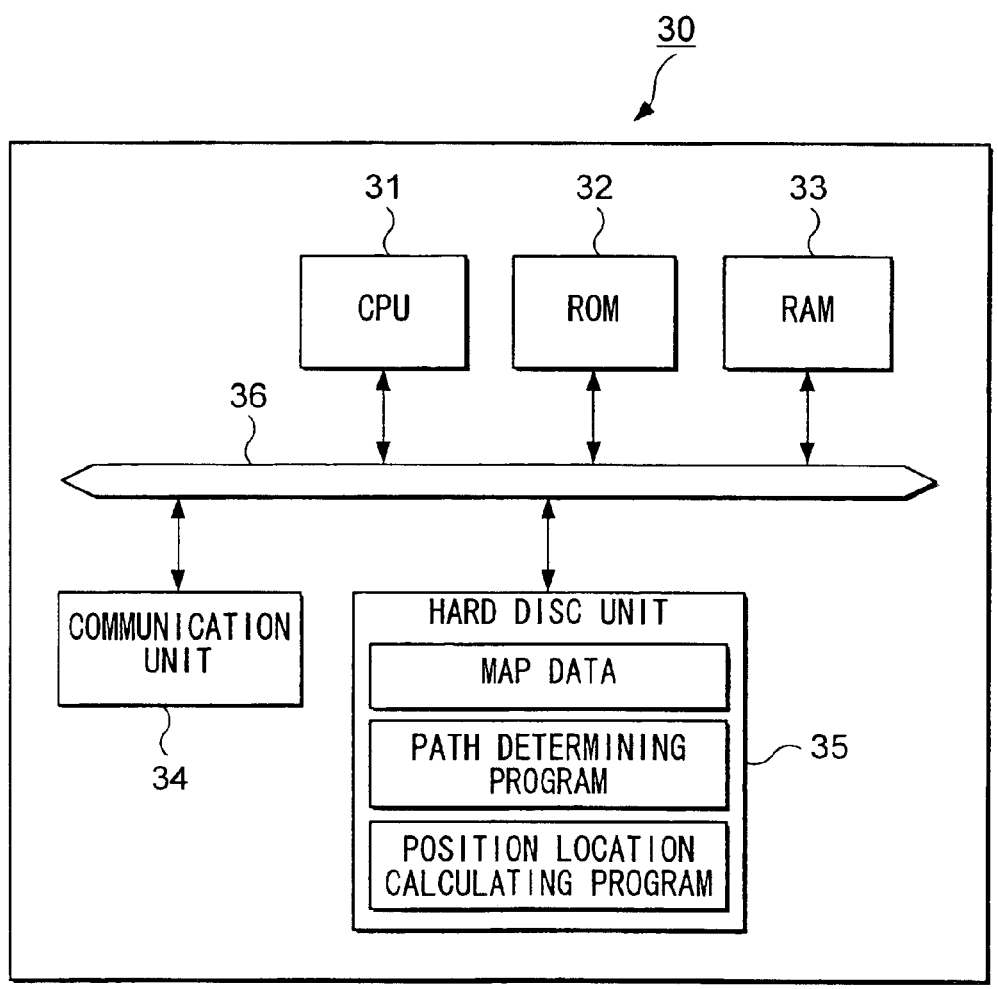
FIG. 5 is a block diagram showing the configuration of the path searching server of the same embodiment.

FIG. 5 is a block diagram showing the configuration of path searching server 30. As shown in FIG. 5, the path searching server 30 is equipped with a CPU 31, a ROM 32, a RAM 33, a communication unit 34, a hard disc unit 35, and a bus 36 which connects these devices to each other.

The programs, such as an IPL (Initial Program Loader), that perform basic control of each unit of the server is stored in ROM 32. The CPU 31 reads out these programs and executes the basic control processes for each unit of the path searching server 30. The RAM 33 temporarily stores various kinds of data and also provides work areas for CPU 31 where the CPU 31 executes programs to be carried out.

The communication unit 34 comprises a connection interface that provides connection with the PHS network 20 or a modem, and performs data communication with the PHS terminal 10 via the PHS network 20.

The hard disc device 35 stores map data presented in the form of a latitude and longitude matrix; a position location calculating program for determining the location of the PHS terminal 10; and a path determining program for determining the optimum route from the current location to a destination based upon the map data.

The map data stored in the hard disc device 35 is in the configuration of vector data. Specifically, the vector data displays the stored map data which are for instance roads, buildings and so forth (referred to as map elements hereafter) which make up the map, using polygons and text data. In the map data, the names of the map elements are correlated. The coordinates of the map elements which make up the vector data are presented in the form of the latitude and longitude matrix. Thus, in the present embodiment, the vector data configuration is adopted instead of the raster configuration. The vector data configuration hierarchically retains a plurality of map data in relation to various scales, thereby enabling the processes of enlarging or reducing the size of a displayed map progressively at scales as the user wishes.

The position location calculating program contains a base station table (not shown) in which the base station IDs (IDentifications) of the base stations 21 are recorded in relation to latitude-longitude data indicating the locations of the base stations 21. This base station table is used for determining the location of PHS terminal 10.

The path searching program contains a map element table in which the addresses and the telephone numbers of buildings or map elements are recorded in relation to the latitudes and longitudes of the locations of these map elements. This map element table is used for specifying the location of a destination designated by the user.

B: Operation

Next, the operations of the embodiment which are performed in the above mentioned configuration will be explained.

Figure 6:
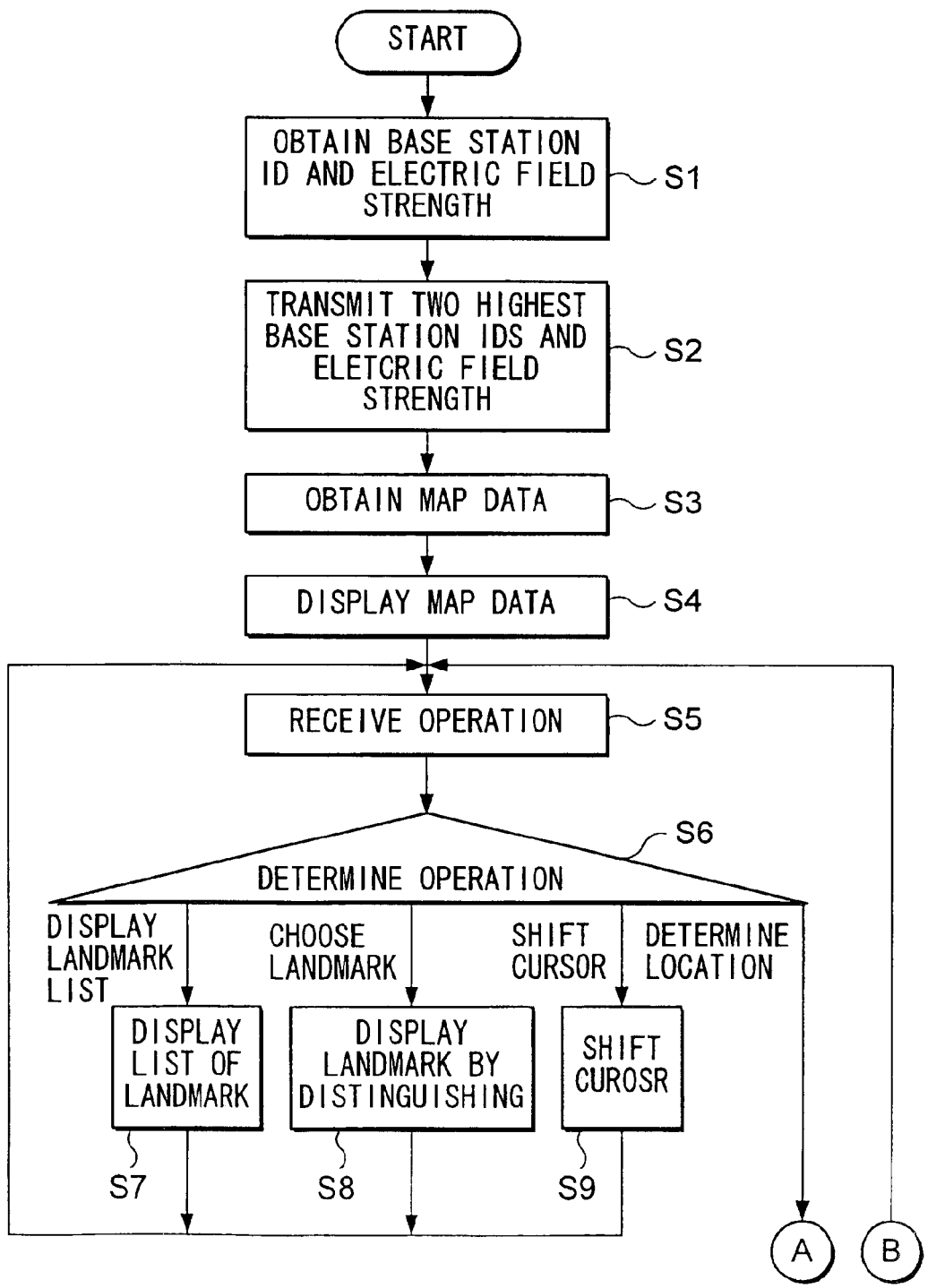
FIG. 6 is a flowchart showing the operation of the CPU of a PHS terminal of the same embodiment.
Figure 7:
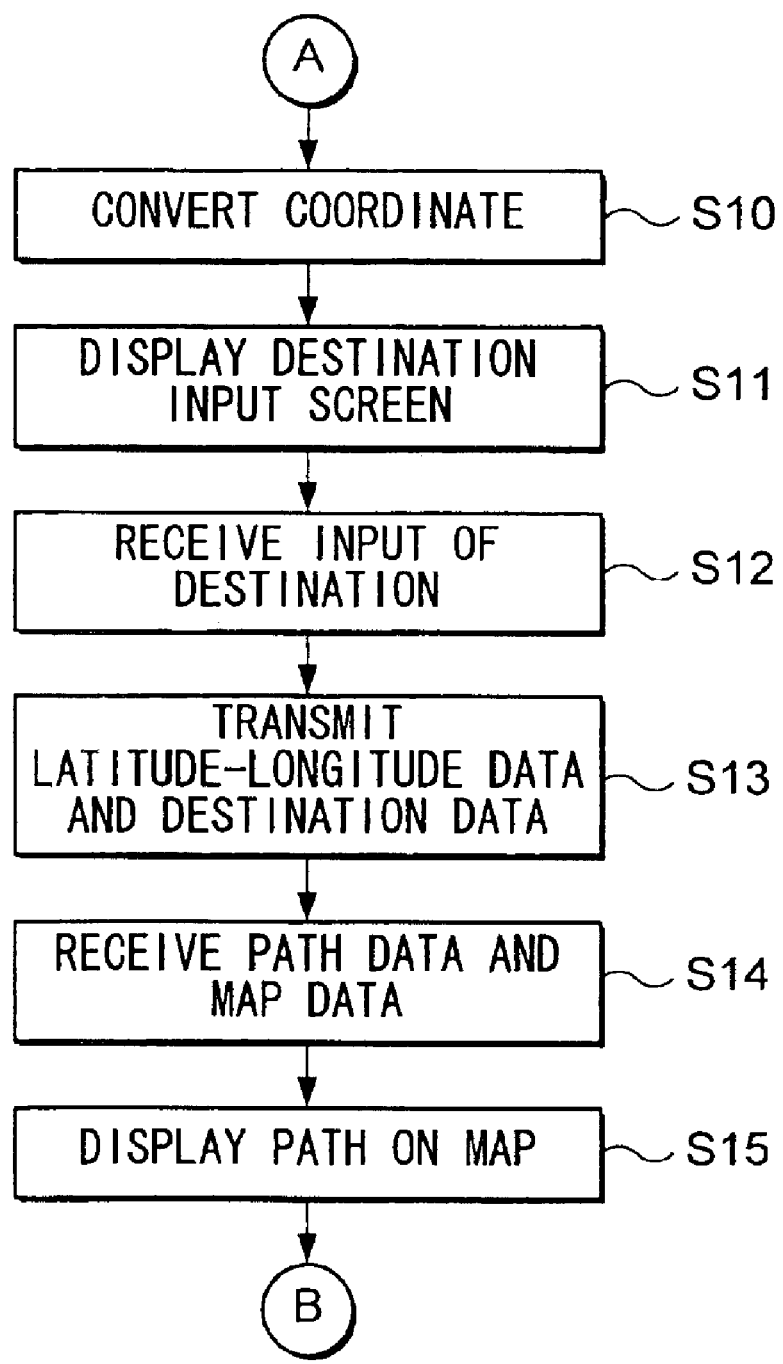
FIG. 7 is a flowchart showing the operation of the CPU of a PHS terminal of the same embodiment.
Figure 8:
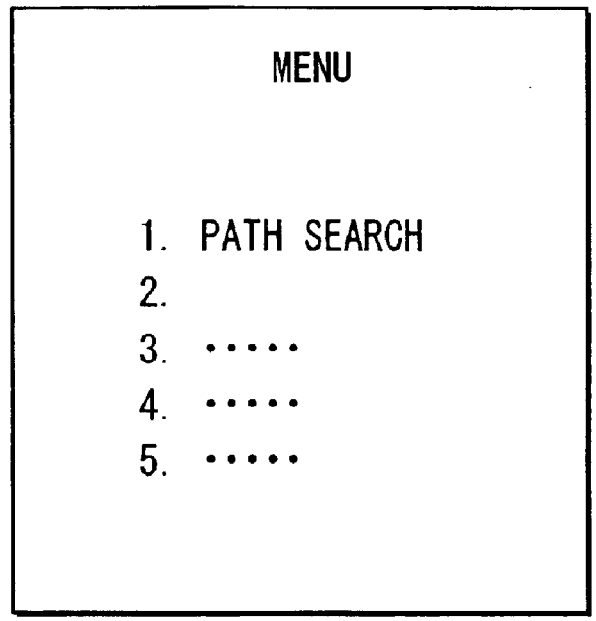
FIG. 8 is a pattern diagram showing a screen example to be displayed on the liquid crystal display of a PHS terminal of the same embodiment.

FIG. 6 and FIG. 7 are flowcharts showing the operations of the CPU 12 of the PHS terminal 10 when a route search is carried out. Also, FIG. 8 to FIG. 15 show some examples of the screens displayed on liquid crystal display 151.

(1) Operations for Displaying the Current Location

First, as the user presses menu key 163 of the keypad, CPU 12 of the PHS terminal 10 reads out the menu screen data stored beforehand in ROM 13 and displays the menu screen (FIG. 8) on liquid crystal display 151.

As the user operates cursor keys 162 and presses determination key 164 after choosing the item "1. Path Search" displayed in the menu screen, CPU 12, in response, activates the path guiding program stored in ROM 13 and begins the process shown in FIG. 6.

In FIG. 6, CPU 12 first obtains information on the electric field strengths of the received annunciation signals from the electric field strength detecting circuit of the radio communication unit 11 (Step S1). This information contains the two highest values of the electric field strength among the annunciation signals received from a plurality of base stations 21 and the base station IDs (IDentifications) of the two highest annunciation signals.

Then CPU 12 transmits the obtained values of the electric field strength and the base station IDs (IDentifications) to path searching server 30 via radio communication unit 11 (Step S2).

When path searching server 30 receives the values of the electric field strength and the base station IDs (IDentifications), it executes the location calculating program and calculates the latitude and the longitude of the location of the PHS terminal 10. Specifically, the path searching server 30 searches the base station table stored in the hard disc device 35 and obtains the latitudes and the longitudes of the locations of the base stations 21 identified by the two base station IDs (IDentifications). The path searching server 30 then connects the locations of the two base stations by a line and determines the latitude and the longitude of the location on the line which divides the line pro rata based on the electric field strengths of the signals from the two base stations. A circle of a predetermined radius is drawn with the location determined on the line as the center that represents the range of an error of the determined location of the PHS terminal 10. The radius of this circle area may be some hundred meters in the present embodiment. The location data representing the location of the PHS terminal 10 includes the latitude and the longitude of the center of this circle area and the radius of the circle.

With the location of the PHS terminal 10 being determined in this manner, path searching server 30 reads out the map data encompassing the circled area (for instance, a 500-meter radius) from the base station table stored on the hard disc device 35, and transmits the read map data, along with the determined location data, to the PHS terminal 10. The map data to be transmitted to the PHS terminal 10 contains the vector data for the map elements to be displayed as polygons and texts indicating the names of the map elements.

As the radio communication unit 11 receives the map data and the location data, CPU 12 of the PHS terminal 10 temporarily stores these data in the SRAM 14 (Step S3).

Then, the CPU 12 converts the map data and the location data from the latitude-longitude coordinates to the X-Y coordinates in which the vertical direction represents the X coordinate and the horizontal direction represents the Y coordinate on the liquid crystal display 151. Furthermore, the CPU 12 obtains the direction information from the ground magnetic sensor unit 18 and displays the map and the location of PHS terminal 10 in the liquid crystal display 151 in such a manner that the direction on the map becomes in agreement with the obtained location information (Step S4).

Figure 9:
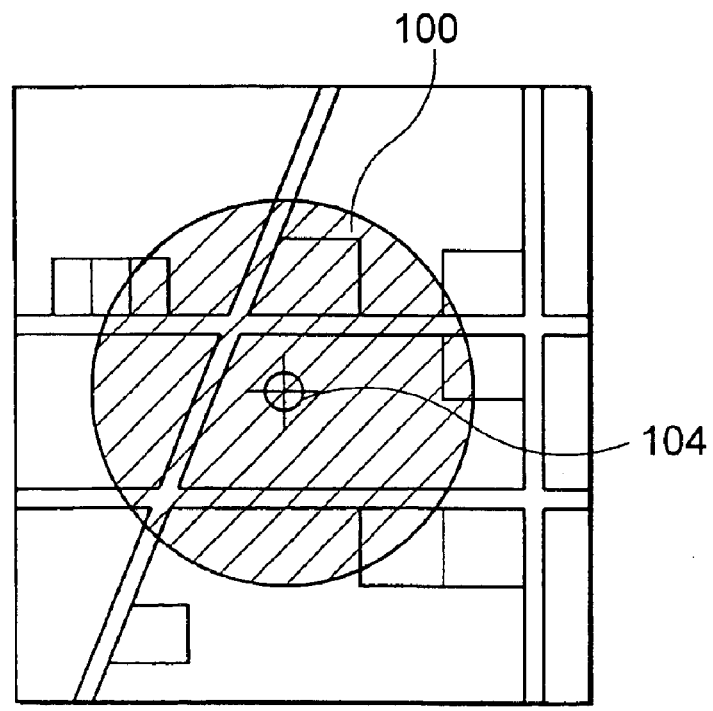
FIG. 9 is a pattern diagram showing a screen example to be displayed on the liquid crystal display of a PHS terminal of the same embodiment.

As a result, as shown in FIG. 9, liquid crystal display 151 displays the map drawn on the map data from the path searching server 30 and circle area 100 drawn in the map on the location data from the path searching server 300. If the PHS terminal 10 is oriented northeast, the direction of the map displayed on the liquid crystal display 151 points northeast on the screen. In this case, the cursor 104 is displayed at the center of circle area 100.

With the map being displayed, the user recognizes that he/she may be found within the circled area 100. Then, as the user performs a specific operation by using keypad 161, the map being display scales up or down, accordingly.

(2) Operations for Correcting the Current Location

In searching for an even more optimal route, the user needs to determine the current location more accurately. This may be done by changing the scale of the map being displayed and having the user point out the location of the PHS terminal 10 on the map being displayed as shown in FIG. 9. However, only with the illustrations of roads or buildings, it may be difficult for the user to determine the location of the user.

In order to help the user determine the current location of the user on the map, in the present embodiment the CPU 12 extracts, from the location data in the SRAM 14, all the landmark elements (referred to as landmarks hereafter) that exist within the area 100 designated by the location data. The CPU 12 then extracts, from the SRAM 14, the text identifications of the landmarks, lists the identifications and prompts the user to choose the nearest landmark from that list. The detailed operation will be explained hereafter.

First, in Step S4 in FIG. 6, when the user operates the keypad 161 and designates the item "Landmark List Display," the CPU 12 receives the key operation (Step S5) and identifies the operated key (Step S6).

The landmark list is displayed (Step S6; landmark list display). Then, CPU 12 extracts all the map elements which exist within circle area 100 designated by the location data stored in SRAM 14. Along with the map elements, the text data which identifies the extracted map elements are extracted from the SRAM 14 and are listed (Step S7).

More specifically, the CPU 12 performs the following processes.

First, the CPU 12, using the coordinates of the center of circle area 100 (X0, Y0) and the radius R (meters) of the circle area, extracts all the vector data encompassed by the circle area 100. The circle area 100 is represented by the equation "$(X-X0)^2+(Y-Y0)^2=R^2$" on the map data in the X-Y coordinate system. Then the CPU 12 reads out, from the SRAM 14, the text data which correspond to the extracted vector data and lists the text data. When Step S7 ends, the process of the CPU 12 goes back to Step S5 and waits for a further input.

Figure 10:
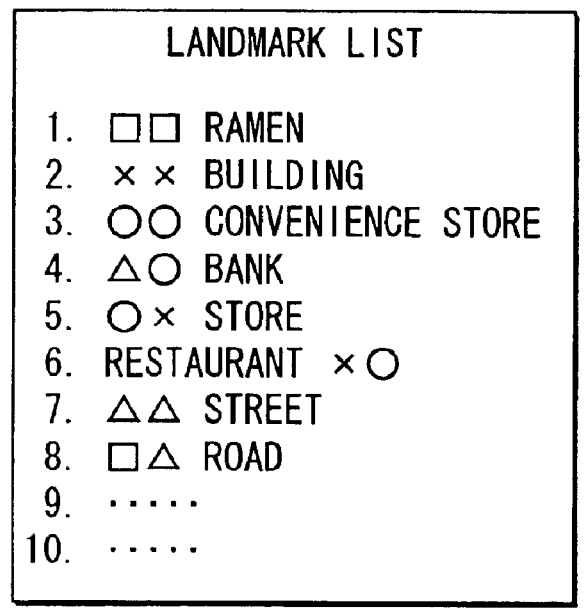
FIG. 10 is a pattern diagram showing a screen example to be displayed on the liquid crystal display of a PHS terminal of the same embodiment.

In this process, a list of the names of the landmarks which exist within the circle area 100 designated by the location data are displayed on liquid crystal display 151 as shown in FIG. 10. The user may press the cursor key 162 to scroll down the list. Also, in stead of displaying landmarks of various types all together as shown in FIG. 10, the list may be displayed by category, such as "restaurant", "shop" or "the name of the road." From the landmark list, the user may choose a landmark he/she found nearby.

Then, the user further operates the keypad 161 and chooses the nearby landmark from the displayed landmark list. In Step S5, the user may choose a plurality of landmarks simultaneously. For instance, the user may choose both items "7. □□ street" and "3. ○○ convenience store" from the landmark list shown in FIG. 10 if the user is standing in front of the "○○ convenience store" on the "□□ street."

Figure 11:
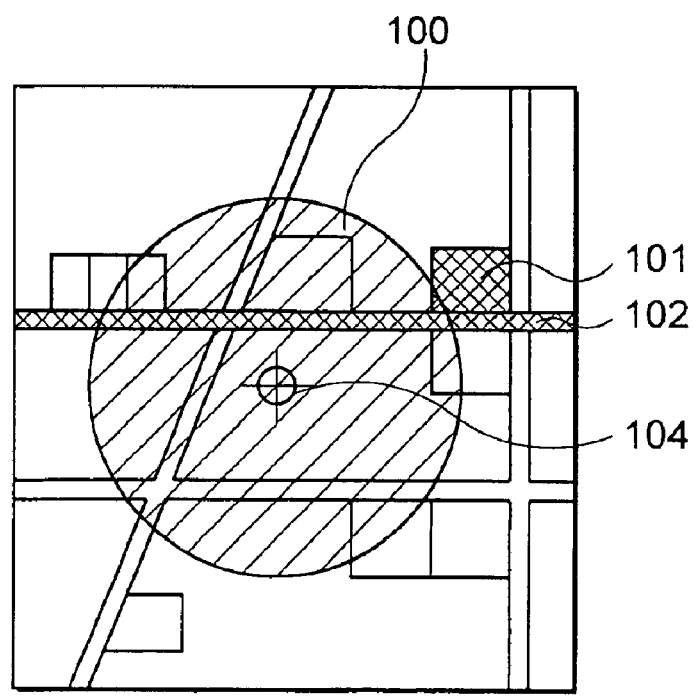
FIG. 11 is a pattern diagram showing a screen example to be displayed on the liquid crystal display of a PHS terminal of the same embodiment.

When the nearby landmarks (Step S6; landmark choice) are selected, the CPU 12 reads out the vector data of the chosen landmark, and displays the polygon zone represented by the vector data in a prominent color, such as red or yellow (Step S8). In this operation, "□□street" 102 and "○○ convenience store" 101 chosen by the user are displayed in a different display mode so that they can be easily distinguished from the other map elements on liquid crystal display 151 as shown in FIG. 11. As Step S8 ends, the process of CPU 12 goes back to Step S5 and waits for further input.

When the user operates cursor keys 162 while the map is displayed, the CPU 12 receives this operation (Step S5) and moves the cursor on the map (Step S6; cursor shift). As a result, the cursor 104 moves on the map being displayed on liquid crystal display 151 (Step S9).

Figures 12, 13:
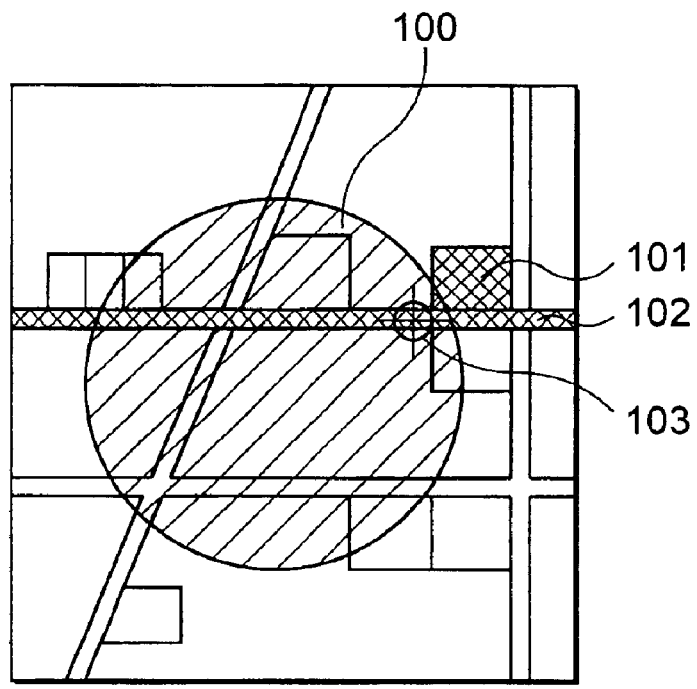
FIG. 12 is a pattern diagram showing a screen example to be displayed on the liquid crystal display of a PHS terminal of the same embodiment.
FIG. 13 is a pattern diagram showing a screen example to be displayed on the liquid crystal display of a PHS terminal of the same embodiment.

Then, as shown in FIG. 12, the user shifts the cursor 104 to the location in front of the "○○ convenience store" on the "□□street" (the location shown by mark 103 in FIG. 12) and presses the determination key 164. The CPU 12 receives this operation (Step S5) and converts the X-Y coordinates of the cursor 104 into the latitude and longitude data, which is then stored in the SRAM 14 (Step S10 in FIG. 7).

Then, the CPU 12 displays the screen shown in FIG. 13 to prompt the user to input his/her destination (Step S11). In the example shown in FIG. 13, the user may input the address of the destination or the telephone number of the destination to specify the destination.

Figure 14:
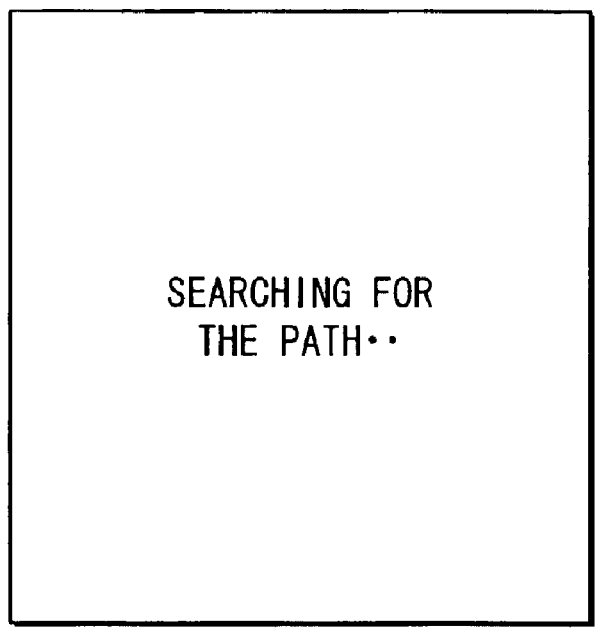
FIG. 14 is a pattern diagram showing a screen example to be displayed on the liquid crystal display of a PHS terminal of the same embodiment.

When the user inputs the destination, using the numeric pad 165, the CPU 12 receives the input operation (Step S12) and transmits, to the path searching server 30 via radio communication unit 11, the latitude-longitude data representing the location of the cursor 104 stored in the SRAM 14 and the destination data representing the destination address (Step S13). Hereafter, a screen message such as shown in FIG. 14 is displayed on the liquid crystal display 151 until the process in Step S15 begins. The screen message notifies the user that a search for the optimum route is being conducted.

On the other hand, when the path searching server 30 receives the latitude-longitude data and the destination data, it carries out a search for the optimum route on the basis of the received information. Specifically, the path searching server 30 first searches the map element table for the latitude and the longitude of the destination, using the address indicated by the destination data. Then the path searching server 30 determines the optimum route from the current location to the destination.

As the optimum route is determined, the path searching server 30 transmits, to PHS terminal 10, the path data indicating the calculated path and the map data showing the vicinity along the calculated path.

Figure 15:
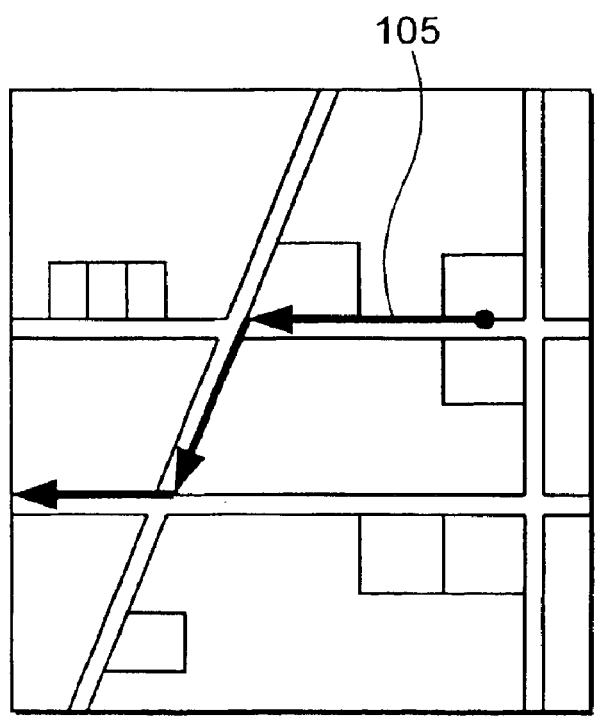
FIG. 15 is a pattern diagram showing a screen example to be displayed on the liquid crystal display of a PHS terminal of the same embodiment.

When the radio communication unit 11 receives the route data and the map data (Step S14), the CPU 12 of the PHS terminal 10 converts it from the data in the latitude and longitude coordinate system to the data in the X-Y coordinate system and displays the route on the liquid crystal display 151 (Step S15). In this procedure, on the liquid crystal display 151, the route 105 indicated by the route data from the path searching server 30 is displayed on the map represented by the map data from the path searching server 30, as shown in FIG. 15.

The user can confirm the route in greater detail by scrolling the displayed area on the map toward the top, the bottom, the right or the left, or by enlarging or reducing the map by pressing keypad 161.

As explained above, in this embodiment, with the location being displayed on the map that is obtained from the locations of the base stations 21 of the PHS network 20, together with the error range, the user can be notified of the area in which he/she is currently standing.

Also, the user can be assisted in determining his/her current location more easily by displaying landmarks. Nearby landmarks are selected as the reference points for correcting his/her current location and highlighted to distinguish them from the other map elements.

It may be possible to display the names of map elements directly on the map being displayed in order to have the user determine the current location. But this method may not be so desirable for the following reasons.

Since liquid crystal display 151 is extremely small, if the names of the various map elements are all displayed, the letters of the names would overlap and would be obscured by one another. It may solve this problem to only display the names of major map elements. When the names of the map elements are selectively displayed, the user may not face much difficulty in determining his/her current location if he/she can recognize a nearby map element among the map elements being displayed. But the user may not always be able to recognize a nearby element among the map elements being displayed. In the present embodiment, the user can find the nearby landmarks easily because the landmarks are listed on the display.

C: Modification Examples (1) Method for Correcting the Current Location

In the embodiment of the present invention described above, the user is assisted in determining the user's current location by distinctively displaying selected landmarks to differentiate them on the map from the other map elements. But it does not have to be limited to this method. In another embodiment, the location of a landmark selected by the user from the landmarks listed on the map can be taken as the current location of the user. For instance, if the user is within or right in front of a building of the selected landmark, it would be desirable to take the location of the specified landmark as the current location of the user because the location correction operation can be carried out much faster.

Also, in the above embodiment, the cursor 104 being displayed is shifted on the map in response to the key operation by the user. Alternatively, the map can be shifted with respect to the cursor 104 being displayed stationary, for instance, at the center of the liquid crystal display 151. In other words, in order to show the relative location of cursor 104 on the map, it does not matter whether the cursor 104 is shifted or the map is shifted.

Also, in the above embodiment, the location of cursor 104 is transmitted to the path searching server 30 after it has been converted to the location in the latitude and longitude coordinate. It should be appreciated that it is also possible to transmit to the path searching server 30 both the latitudes and the longitudes of the map being displayed in the four corners of liquid crystal display 151 and the X-Y coordinates of cursor 104 on liquid crystal display 151. In this process, the path searching server 30 can recognize the area of the map being displayed and the location of the cursor 104 on that map. The path searching server 30 can thereby calculate the latitude and the longitude of the cursor 104.

(2) Measuring Method

In the above embodiment, the current location was calculated so as to be a point at distances from two base stations 21 in proportion to the values of the electric field strengths of the annunciation signals received from the base stations. But it is not necessarily limited to this method. For simplicity in calculating the location, the middle point of the two base stations may be used as the current location.

Also, the PHS terminal 10 may carry out all the calculation processes for determining the current location. To do all the calculations, the PHS terminal 10 needs to have a base station table that stores the base station IDs (IDentifications) of base stations 21 and the latitude-longitude data for the locations of the base stations 21.

Also, the position location calculation is not limited to the method that uses base stations 21. For instance, it is possible to obtain the precise location, using a GPS function installed in the PHS terminal 10. The method that uses the locations of base stations 21 causes a greater error in the position location calculation than the method that uses the GPS function. Therefore, it is more effective if the GPS function is applied to the present invention.

(3) Mode of a PHS Terminal

In the above embodiment, the PHS terminal 10 is equipped with a calling function and a data communication function, but it is also possible for the PHS 10 terminal to be equipped only with the data communication function.

Also, the calling function and the displaying function can be separated. For instance, by connecting the PHS terminal to the navigation terminal equipped with a liquid crystal display, it is possible to operate the two terminals together with the function equivalent to the above mentioned PHS terminal 10.

Furthermore, the terminal which the user carries is not necessarily limited to the PHS terminal 10, but it can be a mobile communication terminal in a mobile communication network. For instance, it could be a cellular telephone such as PDC (Personal Digital Cellular).

Also, the operation unit 16 is not limited to the model shown in FIG. 3, but it can be equipped with, for instance, a track ball, a jog dial, a joystick and so forth. The liquid crystal display 151 can be constructed as a touch panel and used as both a display unit 15 and an operation unit 16.

(4) Mode of a Display

In the above embodiment, the path is displayed on the map, but it is not necessarily limited to this method. For instance, the path can also be presented with the names of the roads or the names of the intersections located along the calculated path. Since the roads in a city are usually constructed on a vertical and horizontal axis, the path is more easily understood by showing the roads and the intersections by their names. In this case, by allowing the user to choose whether to display the path on a map or to present it with the names of the roads and intersections along the path, the user can choose the display mode he/she wishes.

In the above embodiment, there is no particular reference to the display layer, but the cursor, the map, the path, the menu, and the input screen may constitute one layer, or each one can constitute a separate layer. By means of separate layers, information indicated in each layer does not need to be processed.

(5) Direction Display

In the above embodiment, the map is displayed in such a manner that the direction of the PHS terminal 10 is oriented along the direction of the map on the liquid crystal display 151, but the display direction is not limited to this feature.

For instance, it is also possible to display only north, south, east and west directions on the map.

Also, for instance, when the map as well as the PHS terminal 10 are oriented in the same direction, the user can be notified by a message, a color and so forth, of their corresponding orientation.

(6) Configuration of Path Searching Server

The functions of path searching server 30 described in the above embodiment do not necessarily have to be performed by a single server, but can be performed separately by a plurality of servers. For instance, the location information producing function for calculating the location of the PHS terminal 10, the map data providing function for providing the map data of the vicinity of the specified location, and the path calculation function for calculating the route of the two specified locations can each be installed in different servers. Also, it is possible that a server is equipped with any two of these functions and another server is equipped with the remaining function. Then, the functions equivalent to the above mentioned path searching server 30 can be carried out by these servers while performing data communication among them.

(7) Mode of the Program

The program for the PHS terminal 10 that carries out the operations shown in the above mentioned FIG. 6 and FIG. 7 can be installed as an application program in the PHS terminal 10. For instance, recording a program in a magnetic recording medium that is read by the CPU 12 of the PHS terminal 10 may be carried out. Alternatively, the program may be in an optical recording medium or a ROM, in the PHS terminal 10. Also, a program such as this can be provided to the PHS terminal 10 via a network such as a PHS network or the Internet.

(8) Correction of the Destination

In the above embodiment, the method for correcting the current location is described, but it is also possible for the destination to be corrected. For instance, when the destination is a relatively large place such as an amusement park, the user might wish to specify its parking lot or its gate as the destination instead of specifying the entire amusement park. In such a case, by specifying a narrow area destination, the correction of the location can be carried out, using the same method as the above mentioned correction method of current location.

(9) Application Example

Without limiting to the examples of the navigation explained in the embodiment, various other services can be provided to the user by using the measured location. For instance, the present invention can be applied even when the location of the user is communicated to another user and so forth.

Effects of the Invention

As explained above, the user can correct the location by using the map elements existing in the specified domain. The map elements designated from the listed map elements by the user are differentiated from the other map elements on the map, and the location of the element designated by the user determines the proper location on the map.

Also, in the present invention, the user can easily correct the location since the map elements existing within the specified domain are listed from the obtained location, and the location of the map elements the user designated from the listed map elements are corrected to his/her location.

Also, in the present invention, the user can easily correct the location since the location calculated by using base station identifying information is listed by overlapping with the map, and the location which the user specifies corrects his/her own location on the map displayed.

What is claimed is:

1. In a mobile communication network that performs mobility management of a mobile telephone to provide the mobile telephone with a wireless mobile communication capability, the mobile telephone comprising:

a transmitter that transmits to a server information relating to a mobility management location of the mobile telephone;

a receiver that receives from the server map data comprising vector data for scalable configuration of map elements, along with geographical indications of the map elements, and an approximated geographical location of the mobile telephone, wherein the map elements represent geographical objects and are of general geographical configurations of the geographical objects;

a display that displays to variable scales the map elements in their respective geographical configurations and the approximated geographical location of the mobile phone;

a map element manager that makes, from the received map elements, a list of the geographical indications of map elements and displays the list on the display for selection by a user of the mobile telephone;

a display control that reconfigures displaying of the map elements displayed on the display to make distinctive on the display one or more map elements selected from the list by the user; and a coordinate converter that correlates a location pointed by the user on the display to a corresponding geographical location.

2. The mobile telephone according to claim 1, wherein the information relating to mobility management location of the mobile telephone comprises identifications of nearby base stations selected in accordance with strengths of radio signals therefrom and the signal strengths of the selected nearby base stations.

3. The mobile telephone according to claim 1, further comprising a memory that stores geographical locations of base stations, wherein the information relating to mobility management location of the mobile telephone comprises geographical locations of nearby base stations selected in accordance with strengths of radio signals therefrom and the signal strengths of the selected nearby base stations.

4. The mobile telephone according to claim 2 or 3, wherein two base stations are selected that are sending the strongest signals.

5. The mobile telephone according to claim 1, further comprising a compass, wherein the display displays the map elements for rotation according to a direction of the mobile telephone detected by the compass.

6. The mobile telephone according to claim 1, wherein the map elements have polygonal configurations.

7. The mobile telephone according to claim 1, wherein the map element manager, in making the list, selects all the map elements for listing.

8. The mobile telephone according to claim 1, wherein the map element manager, in making the list, categorically selects map elements for listing.

9. The mobile telephone according to claim 1, wherein the display control displays the selected one or more map elements in a color different from that in which the other map elements are displayed.

10. The mobile telephone according to claim 1, wherein the display displays, along with the map elements, an area of a prescribed geographical size.

11. The mobile telephone according to claim 10, wherein the display displays the area in a circle.

12. The mobile telephone according to claim 1, wherein the coordinate converter correlates a location of a cursor on the display to a corresponding geographical location.

13. The mobile telephone according to claim 1, wherein the transmitter sends the corresponding geographical location and a destination address to the server to enable the server to calculate an optimum route from the corresponding geographical location to the destination address, the receiver receives from the server map data and optimum route data, and the display displays the map data along with the optimum route.

* * * * *